(12) United States Patent
Kapinos et al.

(10) Patent No.: US 11,444,781 B2
(45) Date of Patent: Sep. 13, 2022

(54) DISTRIBUTED TRUST AUTHENTICATION

(71) Applicant: LENOVO (Singapore) PTE. LTD., New Tech Park (SG)

(72) Inventors: Robert J. Kapinos, Durham, NC (US); Robert J. Norton, Raleigh, NC (US); Russell Speight VanBlon, Raleigh, NC (US); Scott W. Li, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 267 days.

(21) Appl. No.: 16/796,528

(22) Filed: Feb. 20, 2020

(65) Prior Publication Data
US 2021/0266176 A1    Aug. 26, 2021

(51) Int. Cl.
*H04L 9/32*    (2006.01)
*H04L 9/40*    (2022.01)
*G06F 16/182*    (2019.01)
*G06F 16/18*    (2019.01)

(52) U.S. Cl.
CPC .......... *H04L 9/3247* (2013.01); *G06F 16/182* (2019.01); *G06F 16/1805* (2019.01); *H04L 9/3236* (2013.01); *H04L 63/08* (2013.01); *H04L 2209/38* (2013.01)

(58) Field of Classification Search
CPC ..... H04L 9/3236; H04L 9/3247; H04L 63/08; G06F 16/182; G06F 16/1805
USPC ........................................................ 713/176
See application file for complete search history.

(56) References Cited

U.S. PATENT DOCUMENTS

| | | | | |
|---|---|---|---|---|
| 7,228,437 B2* | 6/2007 | Spagna | .................... | H04L 67/18 713/193 |
| 7,877,784 B2* | 1/2011 | Chow | ................. | H04L 63/0823 713/168 |
| 8,347,088 B2* | 1/2013 | Moore | .................... | G16Z 99/00 726/2 |
| 8,842,841 B2* | 9/2014 | Hook | .................... | H04L 9/0822 380/278 |
| 10,348,699 B2* | 7/2019 | Starosielsky | ........... | G06F 21/44 |
| 2008/0307513 A1* | 12/2008 | Chow | .................... | H04L 51/12 726/5 |
| 2010/0235649 A1* | 9/2010 | Jeffries | ............... | G06F 21/6209 726/28 |
| 2013/0291060 A1* | 10/2013 | Moore | .................... | H04L 67/02 726/1 |
| 2015/0059003 A1* | 2/2015 | Bouse | .................... | G06F 21/32 726/28 |

(Continued)

*Primary Examiner* — Dant B Shaifer Harriman
(74) *Attorney, Agent, or Firm* — Kunzler Bean & Adamson

(57) ABSTRACT

Apparatuses, methods, systems, and program products are disclosed for distributed trust authentication. An apparatus includes a processor and a memory that stores code executable by the processor. The code is executable by the processor to receive content for a recipient from a content provider. The code is executable by the processor to receive an indicator of the veracity of the received content from the recipient of the content. The indicator of veracity may attest to an authenticity of the received content and an identity of the content provider. The code is executable by the processor to create an entry for the recipient in a public data store to validate that the recipient received the content. The entry may include a digital signature for the recipient and the indicator of the veracity of the received content.

20 Claims, 6 Drawing Sheets

(56) References Cited

U.S. PATENT DOCUMENTS

2019/0342096 A1* 11/2019 Starosielsky ....... H04L 63/0428
2021/0266176 A1*  8/2021 Kapinos .................. G06F 21/64

* cited by examiner

DISTRIBUTED TRUST AUTHENTICATION

FIELD

The subject matter disclosed herein relates to distributed trust authentication and more particularly relates to certificate authentication using a rootless trust.

BACKGROUND

Trust methodology using digital certificates may involve the use of unreliable, unknown, or unsecure third parties. In certain instances, third-party certificate issuers may be subject to intrusion attacks, data loss, information breach, and internal incompetence.

BRIEF SUMMARY

Apparatuses, methods, systems, and program products are disclosed for distributed trust authentication. An apparatus, in one embodiment, includes a processor and a memory that stores code executable by the processor. In certain embodiments, the code is executable by the processor to receive content for a recipient from a content provider. In one embodiment, the code is executable by the processor to receive an indicator of the veracity of the received content from the recipient of the content. The indicator of veracity may attest to an authenticity of the received content and an identity of the content provider. In some embodiments, the code is executable by the processor to create an entry for the recipient in a public data store to validate that the recipient received the content. The entry may include a digital signature for the recipient and the indicator of the veracity of the received content.

A method for distributed trust authentication, in one embodiment, includes receiving, by a processor, content for a recipient from a content provider. The method, in further embodiments, includes receiving an indicator of the veracity of the received content from the recipient of the content. The indicator of veracity may attest to an authenticity of the received content and an identity of the content provider. In certain embodiments, the method includes creating an entry for the recipient in a public data store to validate that the recipient received the content. The entry may include a digital signature for the recipient and the indicator of the veracity of the received content.

A computer program product for distributed trust authentication, in one embodiment, includes a computer readable storage medium having program instructions embodied therewith. In certain embodiments, the program instructions are executable by a processor to cause the processor to receive content for a recipient from a content provider. In some embodiments, the program instructions are executable by a processor to cause the processor to receive an indicator of the veracity of the received content from the recipient of the content. The indicator of veracity may attest to an authenticity of the received content and an identity of the content provider. In further embodiments, the program instructions are executable by a processor to cause the processor to create an entry for the recipient in a public data store to validate that the recipient received the content. The entry may include a digital signature for the recipient and the indicator of the veracity of the received content.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
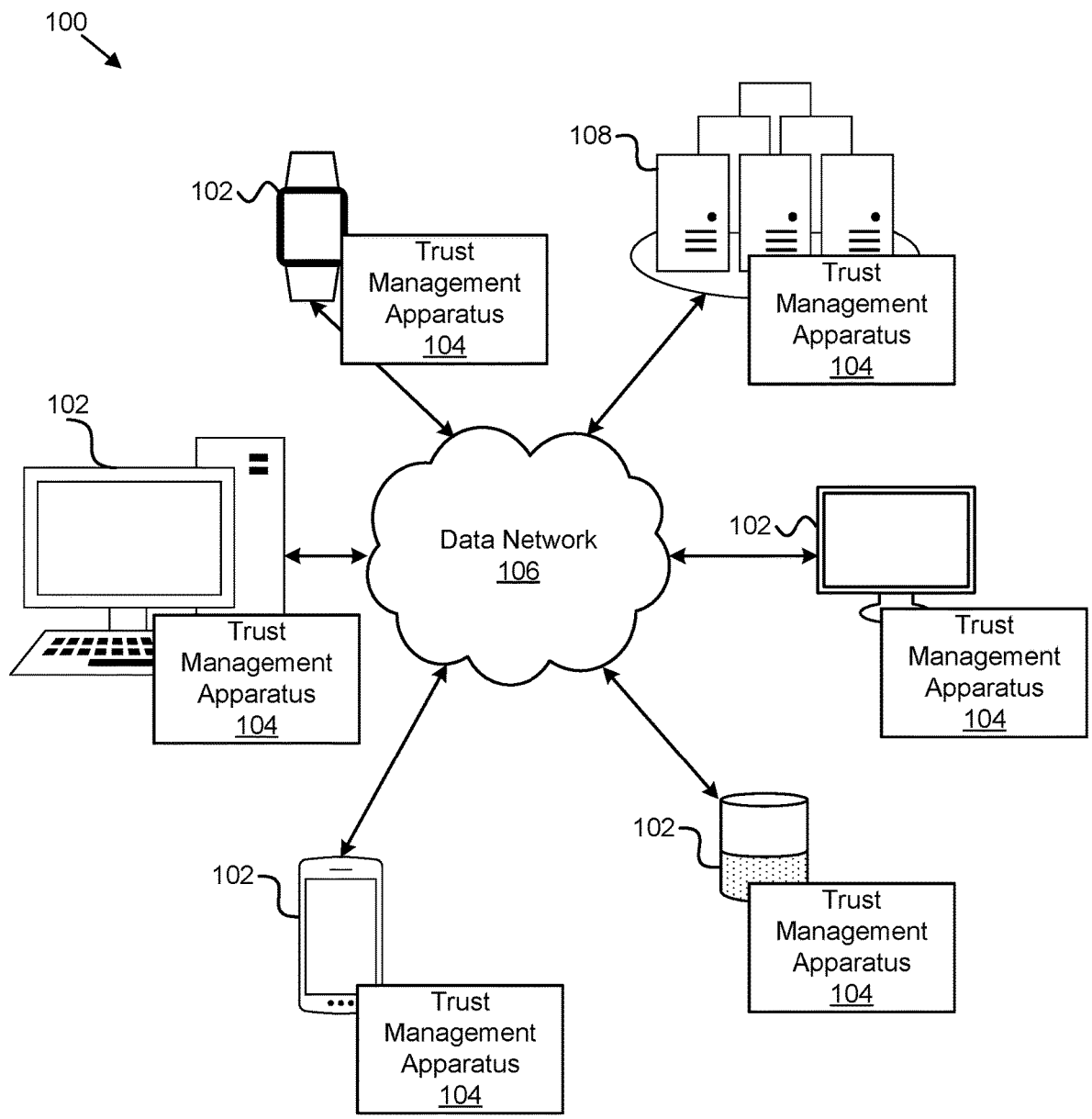
FIG. 1 is a schematic block diagram illustrating one embodiment of a system for distributed trust authentication.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to receive content for a recipient from a content provider. In one embodiment, the code is executable by the processor to receive an indicator of the veracity of the received content from the recipient of the content. The indicator of veracity may attest to an authenticity of the received content and an identity of the content provider. In some embodiments, the code is executable by the processor to create an entry for the recipient in a public data store to validate that the recipient received the content. The entry may include a digital signature for the recipient and the indicator of the veracity of the received content.

In one embodiment, the code is executable by the processor to check one or more entries in the public data store associated with previous recipients of the content to determine a trust score for the content based on the indicators of veracity in each of the one or more entries that the previous recipients submitted. In some embodiments, the indicators of veracity for each of the one or more entries are digitally signed with a previous recipient's digital signature. In one embodiment, the code is further executable by the processor to verify the authenticity of the previous recipient's indication of veracity of the content based on the previous recipient's digital signature and verify the identity of the previous recipient based on the previous recipient's digital signature.

In one embodiment, the trust score comprises a ratio of a number of positive indications of the veracity of the content to a number of negative indications of the veracity of the content. In certain embodiments, the code is executable by the processor to automatically receive the indicator of veracity of the received content without input from the recipient in response to the trust score satisfying a threshold trust score. In some embodiments, the code is executable by the processor to create a root entry in the public data store that includes a unique identifier for the content, the unique identifier digitally signed with the content provider's digital signature, and means for authenticating the content provider.

In one embodiments, the data store comprises an immutable and irrevocable database that is distributable among a plurality of different devices and is publicly available from each of the plurality of different devices. In certain embodiments, the data store comprises a blockchain database. In some embodiments, the code is executable by the processor to negate previous positive votes indicating the veracity of the content in response to the recipient's indicator of veracity being a negative indicator.

In one embodiment, the code is executable by the processor to assign a weight to the indicator of the veracity of the received content according to one or more characteristics of the recipient of the content. In some embodiments, the one or more characteristics comprises a closeness of a relationship between the content provider and the recipient, an organization that the recipient is part of, and the recipient's reputation. In certain embodiments, the code is executable by the processor to, in response to receiving a negative indicator of the veracity of the received content, notify the content provider of the negative indicator.

In further embodiments, the code is executable by the processor to prevent the recipient from providing an indicator of the veracity of the received content in response to determining that the received content is invalid content. In some embodiments, the code is executable by the processor to prompt the recipient to provide the indicator of veracity in response to receiving the content from the content provider.

A method for distributed trust authentication, in one embodiment, includes receiving, by a processor, content for a recipient from a content provider. The method, in further embodiments, includes receiving an indicator of the veracity of the received content from the recipient of the content. The indicator of veracity may attest to an authenticity of the received content and an identity of the content provider. In certain embodiments, the method includes creating an entry for the recipient in a public data store to validate that the recipient received the content. The entry may include a digital signature for the recipient and the indicator of the veracity of the received content.

In one embodiment, the method includes checking one or more entries in the public data store associated with previous recipients of the content to determine a trust score for the content based on the indicators of veracity in each of the one or more entries that the previous recipients submitted. In some embodiments, the indicators of veracity for each of the one or more entries are digitally signed with a previous recipient's digital signature. In certain embodiments, the method includes verifying the authenticity of the previous recipient's indication of veracity of the content based on the previous recipient's digital signature and verifying the identity of the previous recipient based on the previous recipient's digital signature.

In certain embodiments, the method includes creating a root entry in the public data store, the root entry comprising a unique identifier for the content, the unique identifier digitally signed with the content provider's digital signature, and means for authenticating the content provider. In one embodiment, the data store comprises an immutable and irrevocable database that is distributable among a plurality of different devices and is publicly available from each of the plurality of different devices.

A computer program product for distributed trust authentication, in one embodiment, includes a computer readable storage medium having program instructions embodied therewith. In certain embodiments, the program instructions are executable by a processor to cause the processor to receive content for a recipient from a content provider. In some embodiments, the program instructions are executable by a processor to cause the processor to receive an indicator of the veracity of the received content from the recipient of the content. The indicator of veracity may attest to an authenticity of the received content and an identity of the content provider. In further embodiments, the program instructions are executable by a processor to cause the processor to create an entry for the recipient in a public data store to validate that the recipient received the content. The entry may include a digital signature for the recipient and the indicator of the veracity of the received content.

FIG. 1 is a schematic block diagram illustrating one embodiment of a system 100 for distributed trust authentication. In one embodiment, the system 100 includes one or more information handling devices 102, one or more trust management apparatuses 104, one or more data networks 106, and one or more servers 108. In certain embodiments, even though a specific number of information handling devices 102, trust management apparatuses 104, data networks 106, and servers 108 are depicted in FIG. 1, one of skill in the art will recognize, in light of this disclosure, that any number of information handling devices 102, trust management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the trust management apparatus 104 is configured to receive content for a recipient from a content provider, receive an indicator of the veracity of the received content from the recipient of the content where the indicator of veracity attests to an authenticity of the received content and an identity of the content provider, and create an entry for the recipient in a public data store to validate that the recipient received the content where the entry includes a digital signature for the recipient and the indicator of the veracity of the received content. The trust management apparatus 104, including its various sub-modules, may be located on one or more information handling devices 102 in the system 100, one or more servers 108, one or more network devices, and/or the like. The trust management apparatus 104 is described in more detail below with reference to FIGS. 2 and 3.

In various embodiments, the trust management apparatus 104 may be embodied as part of an information handling device 102 such as a smart device, a network device, an Internet of Things device, a computing device, or as a hardware appliance that can be installed or deployed on an information handling device 102, on a server 108, on a user's mobile device, on a display, or elsewhere on the data network 106. In certain embodiments, the trust management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the trust management apparatus 104 may include a power interface, a wired and/or wireless network interface, a graphical interface that attaches to a display, and/or a semiconductor integrated circuit device as described below, configured to perform the functions described herein with regard to the trust management apparatus 104.

The trust management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the trust management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the trust management apparatus 104.

The semiconductor integrated circuit device or other hardware appliance of the trust management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the trust management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like files and content to a different device such as documents, videos, music, podcasts, images, games, web pages, augmented and/or virtual reality environments, and/or the like, and may host, store, and make accessible public databases such as blockchain databases, as described in more detail below.

Figure 2:
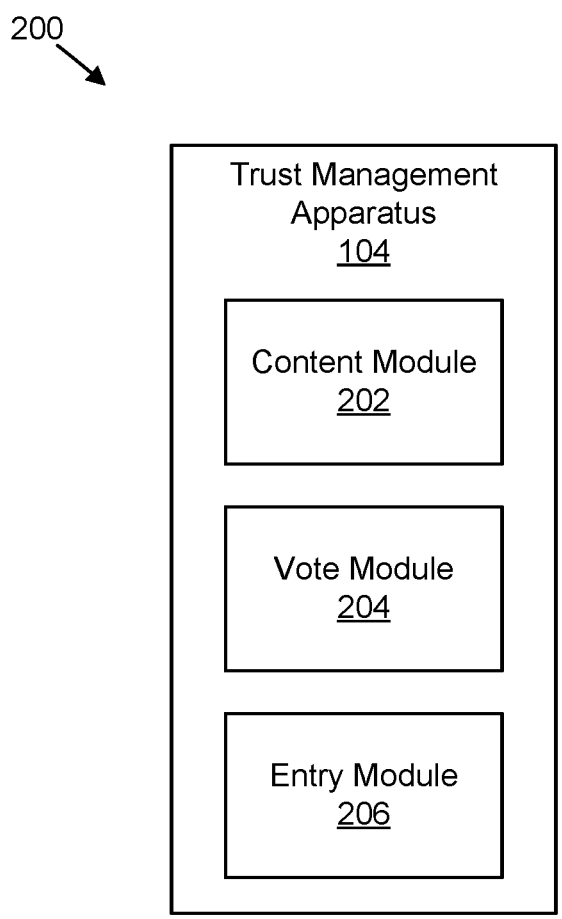
FIG. 2 is a schematic block diagram illustrating one embodiment of an apparatus for distributed trust authentication.

FIG. 2 is a schematic block diagram illustrating one embodiment of an apparatus 200 for distributed trust authentication. In one embodiment, the apparatus 200 includes an instance of a trust management apparatus 104. In one embodiment, the trust management apparatus 104 includes one or more of a content module 202, a vote module 204, and an entry module 206, which are described in more detail below.

In one embodiment, the content module 202 is configured to receive content for a recipient from a content provider. The content may comprise a file such as a document, image, video, music/audio file, hyperlink, web page, and/or the like. The content module 202 may receive the content as an electronic message, e.g., as an attachment to an email message, a text message, an instant message, a social media message, and/or the like; as a download from a web page, a file sharing location, or other remote data store/repository, and/or the like.

In one embodiment, the content module 202, prior to making the content available to a recipient, creates a root entry in a public data store that is used for authenticating the source of the content and the content itself using a rootless trust without a third-party certificate authority. The data store may be a public, immutable, and irrevocable database that is distributable among a plurality of different devices and is publicly available from each of the plurality of different devices. For example, the public data store may be distributed among different servers 108, different information handling devices 102, different network devices, and/or the like.

The data store may be distributed by distributing the same copy of the data store among different devices so that when an entry is added to one copy of the data store, every other copy of the data store gets a copy of the entry. In this manner, if attempts are made to alter or change a transaction in an entry, the other copies of the data store can be used to verify or invalidate the change. An entry in the public data store may include data for various data fields/columns for a row of a database table, and/or the like.

An example of such a database may include a blockchain database. As used herein, a blockchain database includes a growing list of records, called blocks, that are linked using cryptography. Each block contains a cryptographic hash of the previous block, a timestamp, and transaction data/payload. By design, a blockchain is resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for inter-node communication and validating new blocks. Once recorded, the data in any given block cannot be altered retroactively.

Regarding the content provider, the content module 202 may create a root entry in the public data store for the content. The root entry may include transaction data that includes a unique identifier for the content, the unique identifier digitally signed with the content provider's digital signature, and means for authenticating the content provider, e.g., the content provider's public/private key pair, a digital certificate issued to the content provider, social media data identifying the content provider, and/or the like. The unique identifier for the content may be a hash of the content, but other unique identifiers may be envisioned as long as they uniquely distinguish the content from other content that has entries stored in the public data store.

The unique identifier is then digitally signed with the content provider's digital signature, which may include the content provider's private key of a private/public key pair. The resulting signed unique identifier is also stored in the entry, along with the content provider's public key so that when the content module 202 receives the content for the recipient, the authentication module 304, described below, can verify the authenticity and validity of the content itself, and also the identity of the content provider using the content provider's public key and comparing the resulting unique identifiers.

For example, a content provider may post their resume for download from a website. Upon posting the resume and making it available, the content module 202 may generate a hash of the resume and digitally sign the hash with the content provider's private key. The content module 202 may create an entry in the public database that includes the hash of the content provider's resume, the digitally signed hash of the content provider's resume, and the content provider's public key, which may be used to verify and authenticate the content and the content provider.

In one embodiment, the vote module 204 is configured to receive an indicator of the veracity of the received content from the recipient of the content. The indicator of veracity attests to an authenticity of the received content and an identity of the content provider. For example, the content provider may initially send his resume to a friend or colleague who then enters or submits a vote indicating whether they trust the content and/or the source of the content. Subsequent accesses or downloads of the resume, by persons known to the content provider and/or by strangers, may result in the recipient entering or submitting a vote of the veracity of the content and/or the content provider.

In such an embodiment, the vote module 204 prompts the recipient to provide the indicator of veracity in response to receiving the content from the content provider. For instance, the vote module 204 may present a vote prompt in an application such as a web browser, an email application, a word processing application, and/or the like in response to the recipient accessing, downloading, viewing, and/or the like the content from the content provider. The vote prompt may simply be a Yes/No prompt regarding whether the recipient trusts the content provider and/or the content or may include additional fields for providing comments or the like.

In one embodiment, the vote module 204 assigns a weight to the indicator of the veracity of the received content according to one or more characteristics of the recipient of the content. The one or more characteristics of the recipient may include a closeness of a relationship between the content provider and the recipient, an organization that the recipient is part of, the recipient's reputation, and/or the like.

For example, a veracity vote from a recipient that is an immediate family member, extended family member, or the like of the content provider may not be weighted as highly as a veracity vote from a stranger. Similarly, a veracity vote from a person that is a prominent figure or has a highly regarded reputation in the community, organization, subject matter, and/or the like may be assigned a higher weight than a veracity vote from a person who does not have the same kind of standing or reputation.

In certain embodiments, the vote module 204 prevents the recipient from submitting a veracity vote in response to determining that the content that the content module 202 receives is not valid or authentic. For instance, the content module 202 may verify that the received content from the content provider is legitimate or valid by checking a hash of the content against the hash of the content in the entry in the public data store. If the hashes do not match, then the content is not the same, indicating a discrepancy with the content and/or the entry in the public data store, and the vote module 204 prevents the recipient from submitting a veracity vote (e.g., by not providing a prompt for the recipient's vote).

In one embodiment, the entry module 206 is configured to create an entry for the recipient in the public data store to validate that the recipient received the content. The entry may include a digital signature for the recipient and the indicator of the veracity of the received content. For example, the entry may include a reference, identifier, or the like of one or more previous entries in the public data store that are associated with the content, e.g., with the hash of the content. Furthermore, the entry may include a hash of the content, the hash of the content signed with the recipient's digital signature (e.g., the recipient's private key), the recipient's public key, the recipient's veracity indicator/vote, and the recipient's veracity indicator/vote signed with the recipient's digital signature.

In this manner, there is an immutable, irrevocable, and public transaction record associated with the content provider's content and/or the content provider. As more and more recipients receive or access and submit their votes on the veracity of the content and/or the content provider, there is a permanent, persistent, and unchanging record of the veracity of the content and/or the content provider, essentially creating a rootless trust system that does not require a third-party certificate authority or the like to verify the identity of the content provider and/or the authenticity of the content.

Figure 3:
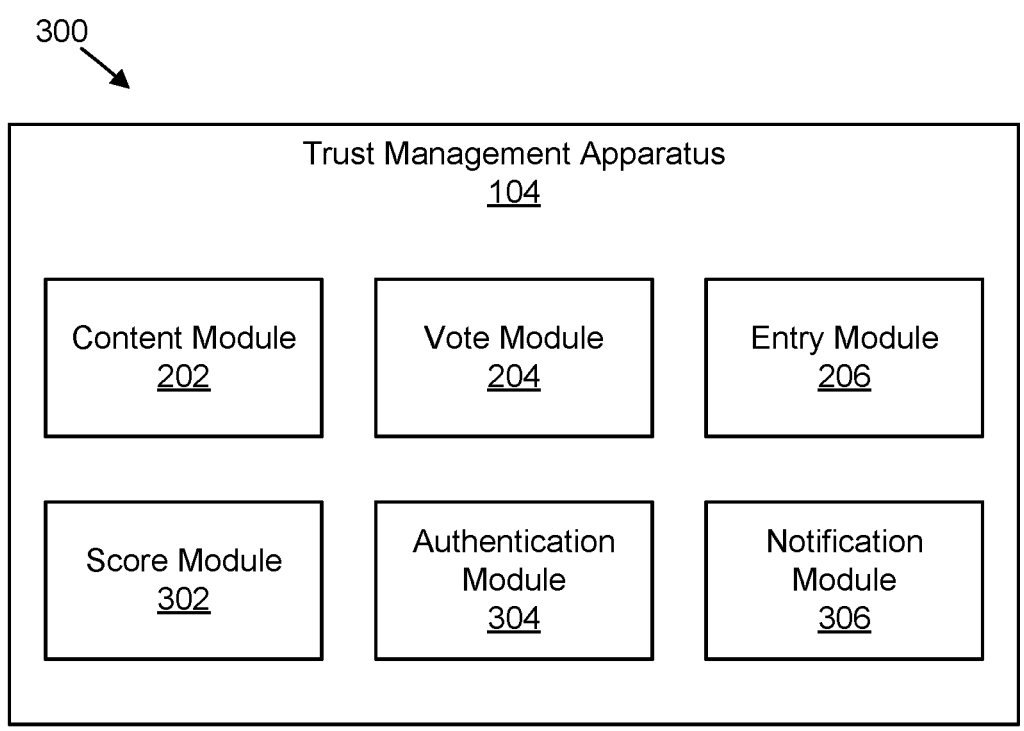
FIG. 3 is a schematic block diagram illustrating one embodiment of another apparatus for distributed trust authentication.

FIG. 3 is a schematic block diagram illustrating one embodiment of another apparatus 300 for distributed trust authentication. In one embodiment, the apparatus 300 includes an instance of a trust management apparatus 104. The trust management apparatus 104, in certain embodiments, includes a content module 202, a vote module 204, and an entry module 206, which may be substantially similar to the content module 202, the vote module 204, and the entry module 206 described above with reference to FIG. 2. The trust management apparatus 104, in further embodiments, includes one or more of a score module 302, an authentication module 304, and a notification module 306, which are described in more detail below.

The score module 302, in one embodiment, is configured to check one or more entries in the public data store associated with previous recipients of the content to determine a trust score for the content based on the indicators of veracity in each of the one or more entries that the previous recipients submitted. The score module 302, for instance, may determine each entry in the public data store that is associated with the content and may track the number of positive votes of veracity and the negative votes of veracity to determine the trust score, which may be the ratio of the number of positive indications of the veracity of the content to a number of negative indications of the veracity of the content and may be adjusted based on the a weighted value, if any, associated with any of the veracity votes, as described above.

In certain embodiments, instead of prompting the recipient for an indicator of veracity, the score module 302 automatically receives the indicator of veracity of the received content without input from the recipient in response to the trust score satisfying a threshold trust score. For instance, if the threshold trust score is 90% positive votes and the trust score that the score module 302 determines is 98%, then the vote module 204 may automatically submit a positive indicator of veracity for the content and/or content provider, which the entry module 206 stores in the public data store. On the other hand, if the threshold trust score is 90% positive votes and the trust score that the score module 302 determines is 88%, then the vote module 204 may automatically submit a negative indicator of veracity for the content and/or content provider.

In one embodiment, if the vote module 204 receives a negative indicator of veracity for the content and/or content provider, the score module 302 and/or the vote module 204 may negate previous positive votes indicating the veracity of the content. For instance, the entry module 206 may submit a flag or other indicator that indicates that the recipient submitted a negative vote of veracity for the content and/or content provider and therefore any previous positive votes of veracity should be disregarded, ignored, and/or the like. In this manner, the veracity votes are asymmetric such that a single vote of invalidity may negate a history of positive trust votes, which may allow the detection of stolen digital signatures and/or invalid content.

In one embodiment, the authentication module 304 is configured to verify the authenticity of the previous recipient's indication of veracity of the content based on the previous recipient's digital signature and/or verify the identity of the previous recipient based on the previous recipient's digital signature, which are stored in the public data store. For example, the authentication module 304 may use the public key that is stored in an entry in the public data store to verify the indicator of veracity that is signed with the private key of the recipient who created the entry in the public data store.

In this manner, a recipient can verify that a previously submitted vote of veracity, whether positive or negative, is a valid vote that was submitted by the recipient who entered the vote, and that the recipient who entered the vote is who they allege they are based on the digital signature of the recipient. Similarly, the authentication module 304 may verify the identity of a content provider and/or recipient associated with an entry based on the recipient's digital signature, e.g., public/private key pair. Thus, when a recipient receives the content, either from the content provider or from another source, the recipient can verify that the content is the content that the content provider made available and that content originally came from the actual content provider.

In one embodiment, the notification module 306 is configured to, in response to receiving a negative indicator of the veracity of the received content, notify the content provider of the negative indicator. The notification module 306, for instance, may send an electronic message to the content provider to notify the content provider that a negative veracity vote was submitted for their content. The electronic message may include a text message, an email message, a social media message, an instant message, a push notification, and/or the like.

Figure 4:
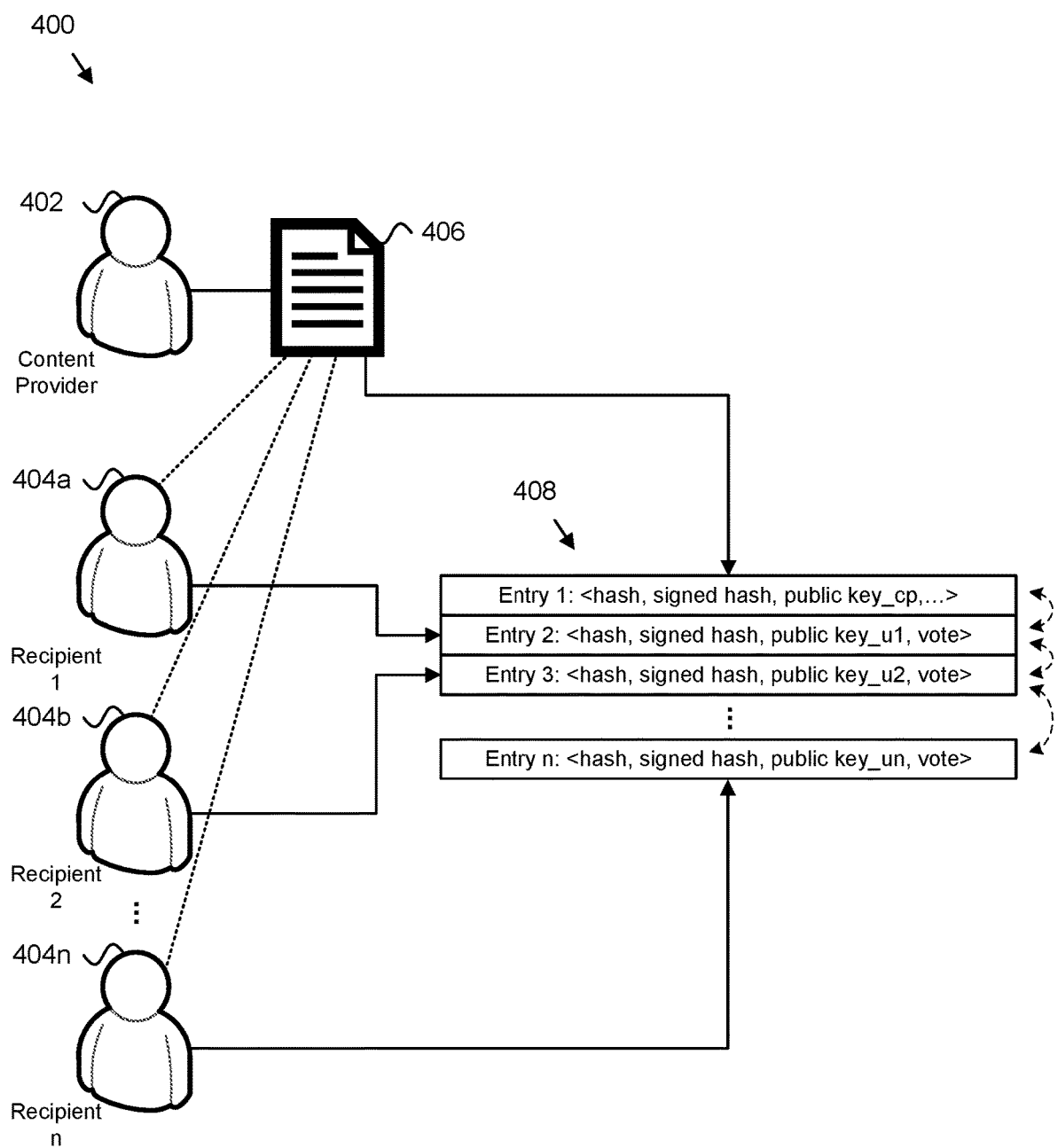
FIG. 4 is a schematic block diagram illustrating one example embodiment of distributed trust authentication.

FIG. 4 depicts an example embodiment of a system for distributed trust authentication. In one embodiment, the system 400 includes a content provider 402 and one or more content recipients 4041-*n* (collectively 404). The content provider 402 provides content 406 such as a file for download or may send the content 406 to the recipients 404.

The content module 202 may receive the content 406 for a recipient 404 and check entries in a distributed data store 408 to verify that the content is legitimate and that the content provider is who he says he is. For instance, when the recipient receives the content 406, the score module 302 may check one or more entries in the distributed data store 408 associated with the content 406 to determine a trust score for the content 406 based on indicators of veracity previously submitted by other recipients.

For example, Entries 2-*n* may include a hash of the content, a hash of the content signed with a recipient's private key, the recipient's public key, and the recipient's vote of veracity for the content, which may also be signed with the recipient's private key. Furthermore, Entry 1 may be the root entry for the content element 406 that includes the hash of the content element 406, the hash digitally signed with the content provider's private key, and the content provider's public key. In certain embodiments, each entry for the content 406 may reference other entries in the data store that are associated with the content 406. In this manner, the veracity of the content can be verified based on previous entries in the data store 408 and a trust score for the content 406 can be determined based on the previously submitted veracity votes.

In one embodiment, if a recipient 404*n* determines that the content 406 is valid content and verifies that the content provider 402 is who he says he is (based on the content provider's digital signature), then the recipient 404*n* submits his positive veracity vote and the entry module 306 creates an entry in the data store 408 for the recipient 404*n*, which adds another vote of trust for content 406 and/or content provider 402. In this manner, a rootless trust system for a content provider 402 and content 406 that the content provider 402 can be established without requiring a third-party trust system or certificate authority.

Figure 5:
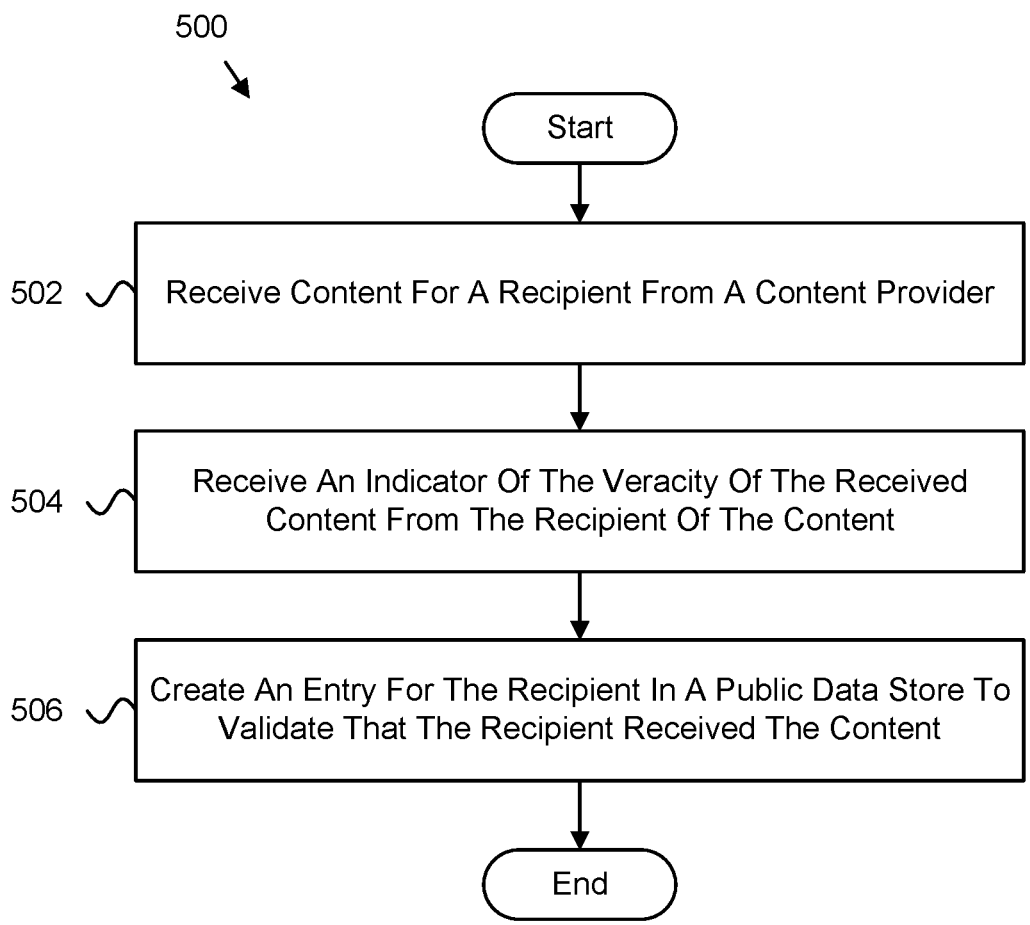
FIG. 5 is a schematic flow chart diagram illustrating one embodiment of a method for distributed trust authentication.

FIG. 5 is a schematic flow chart diagram illustrating one embodiment of a method 500 for distributed trust authentication. In one embodiment, the method 500 begins and receives 502 content for a recipient from a content provider. In further embodiments, the method 500 receives 504 an indicator of the veracity of the received content from the recipient of the content.

In certain embodiments, the method 500 creates 506 an entry for the recipient in a public data store to validate that the recipient received the content, and the method 500 ends. In one embodiment, the content module 202, the vote module 204, and the entry module 206 perform the various steps of the method 500.

Figure 6:
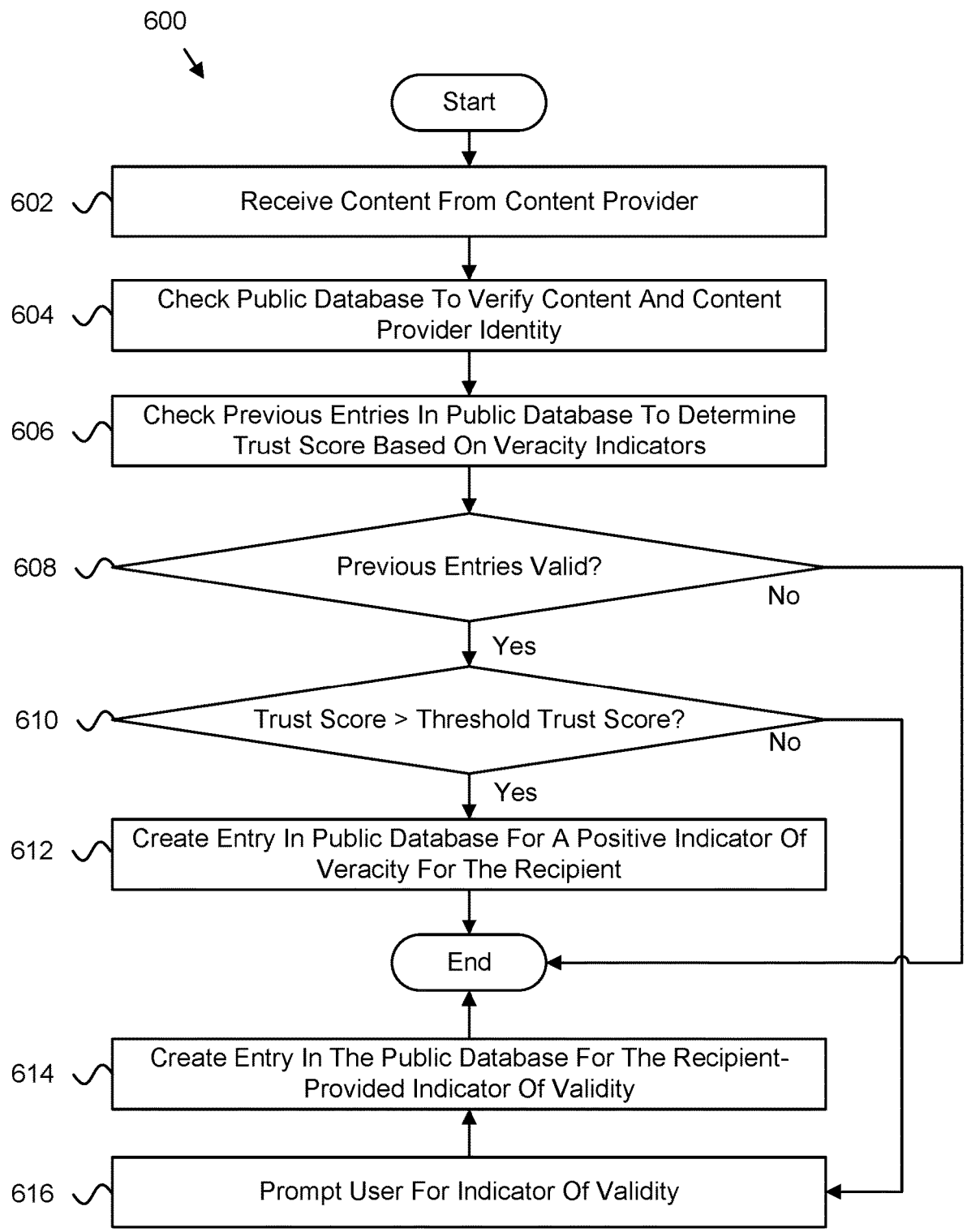
FIG. 6 is a schematic flow chart diagram illustrating one embodiment of another method for distributed trust authentication.

FIG. 6 is a schematic flow chart diagram illustrating one embodiment of another method 600 for distributed trust authentication. In one embodiment, the method 600 begins and receives 602 content from a content provider for a recipient. In further embodiments, the method 600 checks 604 an entry in a public data store to verify the content and the identity of the content provider.

In various embodiments, the method 600 checks 606 previous entries in the public data store that are associated with the content to determine a trust score for the content based on previously submitted veracity votes. If the method 600 determines 608 that one or more of the previous entries in the data store are invalid, the method 600 ends. Otherwise, the method 600 determines 610 whether the trust score satisfies a threshold trust score. If so, then the method 600 creates 612 an entry in the public data store for the recipient with a positive indicator of the veracity of the content/content provider.

Otherwise, the method 600 prompts 616 the recipient for the recipient's indicator of veracity for the content/content provider (e.g., a yes/no vote, a positive/negative indicator, and/or the like). The method 614 creates 614 an entry in the public data store for the indicator of veracity that the recipient provides, and the method 600 ends. In one embodiment, the content module 202, the vote module 204, the entry module 206, and the score module 302 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code executable by the processor to:
receive content for a recipient from a content provider;
receive an indicator of a veracity of the received content from the recipient of the content, the indicator of the veracity attesting to an authenticity of the received content and an identity of the content provider;
check one or more entries in a public data store associated with previous recipients of the content to determine a trust score for the content based on a respective indicator of veracity in each of the one or more entries that the previous recipients submitted; and
create an entry for the recipient in the public data store to validate that the recipient received the content, the entry comprising a digital signature for the recipient and the indicator of the veracity of the received content.

2. The apparatus of claim 1, wherein the respective indicator of veracity for each of the one or more entries is digitally signed with a previous recipient's digital signature, the code further executable by the processor to:
  verify the authenticity of the previous recipient's indication of veracity of the content based on the previous recipient's digital signature; and
  verify the identity of the previous recipient based on the previous recipient's digital signature.

3. The apparatus of claim 1, wherein the trust score comprises a ratio of a number of positive indications of the veracity of the content to a number of negative indications of the veracity of the content.

4. The apparatus of claim 1, wherein the code is executable by the processor to automatically receive the indicator of the veracity of the received content without input from the recipient in response to the trust score satisfying a threshold trust score.

5. The apparatus of claim 1, wherein the code is executable by the processor to create a root entry in the public data store, the root entry comprising a unique identifier for the content, the unique identifier digitally signed with the content provider's digital signature, and means for authenticating the content provider.

6. The apparatus of claim 1, wherein the data store comprises an immutable and irrevocable database that is distributable among a plurality of different devices and is publicly available from each of the plurality of different devices.

7. The apparatus of claim 1, wherein the data store comprises a blockchain database.

8. The apparatus of claim 1, wherein the code is executable by the processor to negate previous positive votes indicating the veracity of the content in response to the recipient's indicator of veracity being a negative indicator.

9. The apparatus of claim 1, wherein the code is executable by the processor to assign a weight to the indicator of the veracity of the received content according to one or more characteristics of the recipient of the content.

10. The apparatus of claim 9, wherein the one or more characteristics comprises a closeness of a relationship between the content provider and the recipient, an organization that the recipient is part of, and the recipient's reputation.

11. The apparatus of claim 1, wherein the code is executable by the processor to, in response to receiving a negative indicator of the veracity of the received content, notify the content provider of the negative indicator.

12. The apparatus of claim 1, wherein the code is executable by the processor to prevent the recipient from providing an indicator of the veracity of the received content in response to determining that the received content is invalid content.

13. The apparatus of claim 1, wherein the code is executable by the processor to prompt the recipient to provide the indicator of veracity in response to receiving the content from the content provider.

14. A method, comprising:
  receiving, by a processor, content for a recipient from a content provider;
  receiving an indicator of a veracity of the received content from the recipient of the content, the indicator of the veracity attesting to an authenticity of the received content and an identity of the content provider;
  checking one or more entries in a public data store associated with previous recipients of the content to determine a trust score for the content based on respective indicators of veracity in each of the one or more entries that the previous recipients submitted; and
  creating an entry for the recipient in the public data store to validate that the recipient received the content, the entry comprising a digital signature for the recipient and the indicator of the veracity of the received content.

15. The method of claim 14, wherein the respective indicator of veracity for each of the one or more entries is digitally signed with a previous recipient's digital signature, the method further comprising:
  verifying the authenticity of the previous recipient's indication of veracity of the content based on the previous recipient's digital signature; and
  verifying the identity of the previous recipient based on the previous recipient's digital signature.

16. The method of claim 14, further comprising creating a root entry in the public data store, the root entry comprising a unique identifier for the content, the unique identifier digitally signed with the content provider's digital signature, and means for authenticating the content provider.

17. The method of claim 14, wherein the data store comprises an immutable and irrevocable database that is distributable among a plurality of different devices and is publicly available from each of the plurality of different devices.

18. A computer program product, comprising a non-transitory computer-readable storage medium including program instructions embodied therewith, the program instructions executable by a processor to cause the processor to:
  receive content for a recipient from a content provider;
  receive an indicator of a veracity of the received content from the recipient of the content, the indicator of the veracity attesting to an authenticity of the received content and an identity of the content provider;
  check one or more entries in a public data store associated with previous recipients of the content to determine a trust score for the content based on respective indicators of veracity in each of the one or more entries that the previous recipients submitted; and
  create an entry for the recipient in the public data store to validate that the recipient received the content, the entry comprising a digital signature for the recipient and the indicator of the veracity of the received content.

19. The computer program product of claim 18, wherein the respective indicator of veracity for each of the one or more entries is digitally signed with a previous recipient's digital signature, the program instructions further causing the processor to:
  verify the authenticity of the previous recipient's indication of veracity of the content based on the previous recipient's digital signature; and
  verify the identity of the previous recipient based on the previous recipient's digital signature.

20. The computer program product of claim 18, wherein the program instructions further cause the processor to create a root entry in the public data store, the root entry comprising a unique identifier for the content, the unique identifier digitally signed with the content provider's digital signature, and means for authenticating the content provider.

* * * * *